United States Patent

Rock

[15] 3,676,898
[45] July 18, 1972

[54] CONNECTOR FOR PLATES

[72] Inventor: Erich Rock, Hochst, Austria
[73] Assignee: Julius Blum Gesellschaft m.b.H., Hochst, Austria
[22] Filed: Sept. 11, 1970
[21] Appl. No.: 71,435

[30] Foreign Application Priority Data

April 6, 1970 Austria .................. A 3084/70

[52] U.S. Cl. ............... 24/73 PP, 52/285, 52/585, 287/20.92 B, 287/20.92 C, 287/20.92 E
[51] Int. Cl. ............... A44b 21/00, F04b 1/00, B25g 3/38
[58] Field of Search ......... 24/73; 287/127, 20.92 B, 20.92 E, 287/20.92 C; 52/578, 285; 16/159

[56] References Cited

UNITED STATES PATENTS

| 3,088,178 | 5/1963 | Propst | 20/92 E |
| 2,221,141 | 11/1940 | Kindt | 287/127 X |
| 3,351,365 | 11/1967 | Bickl | 287/127 |
| 3,532,369 | 10/1970 | Reilly | 287/127 X |
| 49,386 | 8/1865 | Cross | 287/127 |

FOREIGN PATENTS OR APPLICATIONS

| 245,199 | 6/1965 | Germany | 287/127 |

*Primary Examiner*—Paul R. Gilliam
*Attorney*—Waters, Roditi, Schwartz & Nissen

[57] ABSTRACT

A connector is provided which is made of two coaxial parts having interengaging projections and recesses. The recesses are bounded by walls having saw tooth shaped grooves engaging like grooves on the projections. The parts also have saw tooth shaped peripheral grooves.

3 Claims, 5 Drawing Figures

CONNECTOR FOR PLATES

This invention relates to a connector for plates, particularly for furniture pieces, consisting of not less than two parts adapted to be inserted into a bore from opposite sides, said parts being provided with peripheral grooves, preferably in the form of saw teeth, and with axial projections and cooperating recesses, the projection of one part penetrating into the recess of the other part during fitting.

Among other things, connectors of this kind serve the purpose of joining another wall at right angles to a furniture wall, for example an intermediate wall, on both sides thereof. For the sake of saving costs, one sole connector is used; it cannot be one-part because, in this case, all of its peripheral grooves would have to be bevelled in the same direction in order to enable the connector to be driven into the bore of the plate; this may involve the danger that the connector might be withdrawn from the bore in direction of the insertion on the other side owing to forces exerted by the wall secured to it.

As the plate is usually of small thickness, each part is provided with axial projections virtually extending to the other plate surface and equally provided with grooves.

Usually the connectors are made of plastic material for reasons of costs, the projections thus springing inside. In order to secure them firmly in the plate, known constructions have appropriate feather or drift elements such as pins, screws, cones or the like, which have to be screwed, driven or the like into the bore of the plate after insertion of the connector.

This implies various disadvantages. Firstly, the feather or drift element makes the construction more expensive and requires additional room. Furthermore, there is the danger that it is secured too strongly and the plate thus bursts, particularly if wood chipboard panels are used. Even in known constructions, removal is hardly possible without damaging the wall of the bore and it is seldom necessary in practice.

These disadvantages are avoided according to the invention in that the recesses are closed inside by a wall against which the projections are supported.

Thus no feather or drift element is required; the projections are impeded from springing back inside by an appropriate construction of the part into which they extend, and the grooves provided thereon penetrate without exception into the wall of the bore, thus fully contributing to securing the part firmly.

In order to employ the counterpart for absorbing tractional forces, it is proposed to provide the projections at their inside and the recesses at their outside with transverse grooves and thus to secure both parts relative to each other. These grooves are very effective because they are provided on surfaces resting upon each other under pressure.

An embodiment of the invention is hereinafter described with reference to the accompanying drawings, in which.

Figure 1:
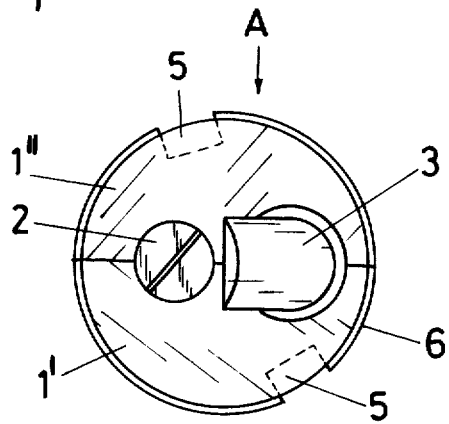
FIG. 1 is a view of part of the connector from the side visible after introduction, i.e. usually that lying flush with the plate surface.

In the described embodiment, each part of the connector comprises two halves 1', 1", which enables the feather or drift element 2 to be introduced into an appropriate recess (now shown). The feather or drift element serves to lock firmly a pin introduced into the bore 3 and secured to a plate or the like. The two halves 1', 1" may subsequently be connected in a mechanical way, by gluing or the like.

Each half 1', 1" of each part of the connector has an axial projection 4 and a recess 5 and is provided with peripheral grooves 6 in the form of saw teeth.

Figure 4:
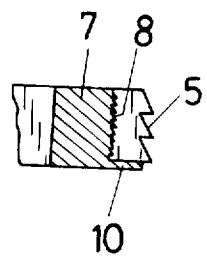
FIG. 4 is a partial sectional view along line IV—IV of FIG. 3.

As shown in FIG. 4, the recess 5 does not extend all the way to the bore 3, but is closed inside by a wall 7. The latter is provided with transverse grooves in the form of saw teeth 8; the inner walls of the projections 4 are also provided with transverse grooves 9.

The recesses 5 do not pass through to the front surface of each part, but are axially closed by a wall 10. This not only provides a reinforcement, but a smooth visible wall.

Figure 2:
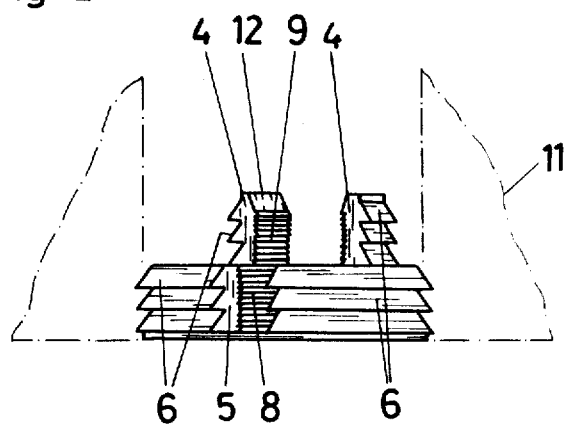
FIG. 2 is a view in direction "A" of FIG. 1.

During fitting, both parts are simultaneously or subsequently pressed or driven into the bore of the wood panel 11 shown in FIG. 2 from opposite sides in such manner that the surfaces are in alignment. Inverse insertion of both parts by carelessness is practically ruled out owing to the projections and recesses spread irregularly over the periphery. When the projections are introduced into the recesses, which is facilitated by the bevelled ends 12, the transverse grooves slide on each other. Removal is impeded by the latter and the grooves biting into the wall of the bore. Thus the grooves on the projections are fully effective, because they are impeded from springing back by the walls 7, without a proper feather or drift element being necessary.

Figure 3:
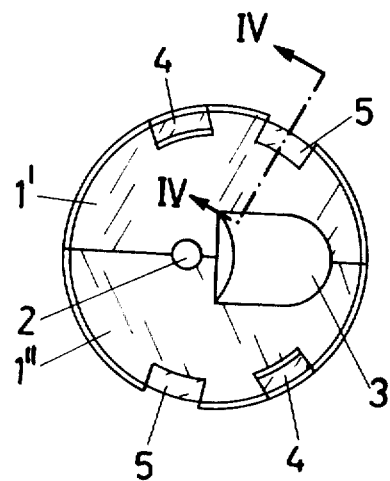
FIG. 3 is a bottom view of the connector shown in FIG. 1.
Figure 5:
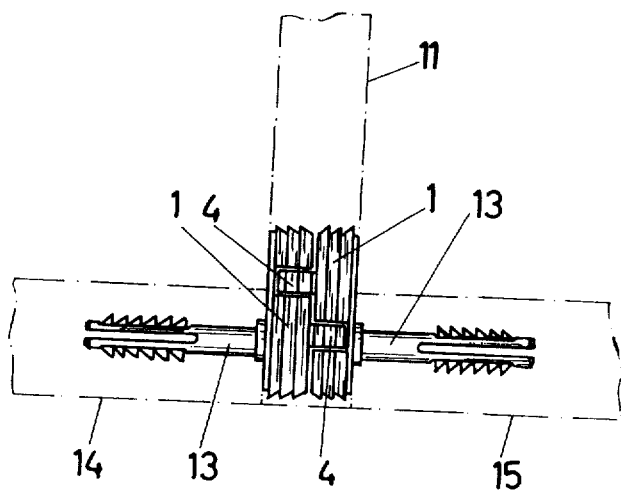
FIG. 5 shows two connectors in twin stop.

FIG. 5 shows two connectors 1 introduced into a wood panel 11 in the form of a furniture intermediate wall in twin stop, one of the axially extending projections being visible for each connector, which projections penetrate into appropriate recesses of the other connector 1, Furthermore, FIG. 5 illustrates the pins 13 firmly locked to respective of connectors 1 by means of feather or drift elements (FIGS. 1, 3), said pins frontally penetrating into the wood panels 14, 15 to be connected with the wood panel 11.

What I claim is:-

1. A connector adapted for use in a bore in a furniture piece, said connector comprising two parts adapted to be inserted into said bore from opposite sides, said parts being provided with peripheral grooves in the form of oppositely directed saw teeth, said parts including axial projections and being provided with recesses, the projection of each part penetrating into the recess of the other part, each part including a wall bounding the corresponding recess, said projections resting against said walls when the parts are fitted together, said projections being provided with grooves on their inner surfaces and said walls being provided with grooves on their outer surfaces, the latter said grooves corresponding to each other and having the form of sawteeth, each part including a second wall axially limiting the corresponding recess.

2. A connector as claimed in claim 1 wherein said projections and recesses are spaced irregularly on said parts.

3. A connector as claimed in claim 1 wherein said projections include bevelled free ends.

* * * * *